United States Patent
Hume et al.

(10) Patent No.: US 10,467,287 B2
(45) Date of Patent: Nov. 5, 2019

(54) SYSTEMS AND METHODS FOR AUTOMATICALLY SUGGESTING MEDIA ACCOMPANIMENTS BASED ON IDENTIFIED MEDIA CONTENT

(71) Applicant: GOOGLE LLC, Mountain View, CA (US)

(72) Inventors: Thomas Weedon Hume, Mountain View, CA (US); Flavio Lerda, Mountain View, CA (US); Mikkel Crone Koser, Copenhagen (DK)

(73) Assignee: GOOGLE LLC, Mountain View, CA (US)

( * ) Notice: Subject to any disclaimer, the term of this patent is extended or adjusted under 35 U.S.C. 154(b) by 729 days.

(21) Appl. No.: 14/104,157

(22) Filed: Dec. 12, 2013

(65) Prior Publication Data

US 2015/0169747 A1    Jun. 18, 2015

(51) Int. Cl.
| | | |
|---|---|---|
| *G06F 16/68* | (2019.01) | |
| *H04N 21/81* | (2011.01) | |
| *G06F 16/438* | (2019.01) | |
| *G06F 16/58* | (2019.01) | |

(52) U.S. Cl.
CPC ........ *G06F 16/686* (2019.01); *G06F 16/4393* (2019.01); *G06F 16/5866* (2019.01); *H04N 21/8106* (2013.01); *H04N 21/8113* (2013.01)

(58) Field of Classification Search
CPC ............ H04N 21/8106; H04N 21/8113; G06F 16/686; G06F 16/5866; G06F 16/4393
See application file for complete search history.

(56) References Cited

U.S. PATENT DOCUMENTS

| | | | | |
|---|---|---|---|---|
| 6,526,400 | B1* | 2/2003 | Takata | G06F 16/58 |
| 9,161,066 | B1* | 10/2015 | Oztaskent | H04N 21/24 |
| 9,961,403 | B2* | 5/2018 | Kritt | G06F 3/0484 |

(Continued)

OTHER PUBLICATIONS

Yi Yu et al., "Automatic Music Soundtrack Generation for Outdoor Videos from Contextual Sensor Information" Oct. 29-Nov. 2, 2012, Nara, Japan. ACM 978-1-4503-1089-5/12/10.

(Continued)

*Primary Examiner* — Pinkal R Chokshi
(74) *Attorney, Agent, or Firm* — Lowenstein Sandler LLP (57) ABSTRACT

The disclosed technology includes automatically suggesting audio, video, or other media accompaniments to media content based on identified objects in the media content. Media content may include images, audio, video, or a combination. In one implementation, one or more images representative of the media content may be extracted. A visual search may be run across the images to identify objects or characteristics present in or associated with the media content. Keywords may be generated based on the identified objects and characteristics. The keywords may be used to determine suitable audio tracks to accompany the media content, for example by performing a search based on the keywords. The determined tracks may be presented to a user, or automatically arranged to match the media content. In another implementation, an aural search may be run across samples of the audio data to similarly identify objects and characteristics of the media content.

17 Claims, 3 Drawing Sheets

(56) References Cited

U.S. PATENT DOCUMENTS

| | | | |
|---|---|---|---|
| 2001/0014621 A1* | 8/2001 | Okubo | A63F 13/10 463/35 |
| 2003/0050784 A1* | 3/2003 | Hoffberg | G06F 17/30743 704/270.1 |
| 2005/0055372 A1* | 3/2005 | Springer, Jr. | G06F 17/30997 |
| 2005/0223071 A1* | 10/2005 | Hosono | H04M 1/72555 709/206 |
| 2006/0227992 A1* | 10/2006 | Rathus | G06F 17/30247 382/100 |
| 2007/0050406 A1* | 3/2007 | Byers | G06F 16/48 |
| 2008/0120290 A1* | 5/2008 | Delgo | G06F 16/907 |
| 2008/0220797 A1* | 9/2008 | Meiby | G06Q 10/107 455/466 |
| 2009/0116695 A1* | 5/2009 | Anchyshkin | G06K 9/00221 382/106 |
| 2009/0119717 A1* | 5/2009 | Newton | G06F 17/30796 725/59 |
| 2010/0023485 A1* | 1/2010 | Cheng Chu | G06F 16/4393 707/E17.014 |
| 2010/0049862 A1* | 2/2010 | Dixon | G06F 17/30035 709/231 |
| 2010/0050064 A1* | 2/2010 | Liu | G06F 16/4393 715/202 |
| 2011/0119293 A1* | 5/2011 | Taylor | G06F 21/10 707/769 |
| 2011/0123015 A1* | 5/2011 | Erhart | G06Q 30/0201 379/265.02 |
| 2011/0231745 A1* | 9/2011 | Levesque | G06F 17/30041 715/202 |
| 2011/0239119 A1* | 9/2011 | Phillips | G06F 3/0482 715/731 |
| 2011/0299832 A1* | 12/2011 | Butcher | H04N 21/234318 386/248 |
| 2012/0316660 A1* | 12/2012 | Luo | G06F 16/78 700/94 |
| 2013/0054613 A1* | 2/2013 | Bishop | G06F 17/30011 707/748 |
| 2013/0103680 A1* | 4/2013 | Arrasvuori | G06F 17/301 707/728 |
| 2013/0202216 A1* | 8/2013 | Fork | G06F 17/30277 382/218 |
| 2013/0238696 A1* | 9/2013 | Cotelo | G06F 17/30867 709/204 |
| 2013/0307997 A1* | 11/2013 | O'Keefe | H04L 51/10 348/207.1 |
| 2014/0161356 A1* | 6/2014 | Tesch | H04L 51/063 382/196 |
| 2014/0178043 A1* | 6/2014 | Kritt | G06F 3/0484 386/241 |
| 2014/0253727 A1* | 9/2014 | Sadrieh | G06F 17/30 348/143 |
| 2014/0304247 A1* | 10/2014 | Fastlicht | G06F 17/30017 707/706 |
| 2015/0070150 A1* | 3/2015 | Levesque | G06F 3/016 340/407.1 |
| 2015/0143409 A1* | 5/2015 | Maughan | H04N 21/262 725/34 |
| 2015/0373404 A1* | 12/2015 | Fukazawa | G06K 9/00288 725/53 |
| 2015/0382083 A1* | 12/2015 | Chen | G06F 16/739 386/281 |

OTHER PUBLICATIONS

Aleksandar Stupar et al., "Picasso—Automated Soundtrack Suggestion forMulti-Modal Data" Proceedings of the 20th ACM international conference on Information and knowledge management pp. 2589-2592, Oct. 24-28, 2011, Glasgow, Scotland, UK.

Marco Cristani et al., "Toward an automatically generated soundtrack from low-level cross-modal correlations for automotive scenarios" Proceedings of the 18th ACM international conference on Multimedia pp. 551-560, Firenze, Italy—Oct. 25-29, 2010.

* cited by examiner

SYSTEMS AND METHODS FOR AUTOMATICALLY SUGGESTING MEDIA ACCOMPANIMENTS BASED ON IDENTIFIED MEDIA CONTENT

BACKGROUND

The rise of web-based social content-sharing platforms has provided users with a convenient way to share pictures and videos with family, friends, and the world at large. Users may create and post, for example, slideshows of pictures from their last vacation, or home videos of a family get-together. Moreover, recent improvements in mobile device technology have enabled the capture, editing, and upload of high definition photos and videos directly from smartphones and tablets.

When sharing such content, users will often wish to add an audio accompaniment, such as sound effects or a background soundtrack, for example, to enrich a slideshow or complement existing audio in a recorded video. However, manually selecting appropriate audio tracks is a daunting task in light of the multitude of sound effects, music, and other audio samples available. Moreover, the compact form factor and user interface of many mobile devices makes the creation of a soundtrack from a mobile device unwieldy and time-consuming, if possible at all.

SUMMARY

Some or all of the above needs may be addressed by certain implementations of the disclosed technology. Certain implementations include suggesting audio, video, or other media accompaniments to media content based on identified objects in the media content. Additional implementations include suggesting arrangements of audio, video, or other media tracks keyed to the appearance of corresponding identified objects. Accordingly, implementations of the disclosed technology may provide an automated aid to enhance the media experience.

According to an example implementation, a method is provided. The method may include receiving images embodying content containing representations of objects. The images may be received at a computing device. The method may further include determining an identity of at least one of the objects. The method yet further including determining one or more keywords representative of the images. The keywords may be determined based on the identified objects. The method may still yet further include determining audio tracks for presentation with the images. The audio tracks may be determined based on the keywords. The method also include outputting an indication of the determined one or more audio tracks.

According to another example implementation, a computer readable medium is provided. The computer readable medium may store instructions that, when executed by at least one processor in a system, cause the processor to perform a method. The method may include receiving a media sequence comprising audio data. The audio data may contain representations of one or more aural features or objects. The method may further include determining an identity of at least one object of the one or more objects. The method may yet further include determining one or more keywords representative of the media sequence. The keywords may be determined based on the identified objects. The method may also include determining one or more audio tracks for presentation with the media sequence. The audio tracks may be determined based on the one or more keywords. The method may include outputting an indication of the determined one or more audio tracks.

According to yet another example implementation, a system is provided. The system may include a memory operatively coupled to a processor and configured for storing data and instructions that may be executed by the processor. When executed, the system may be caused to receive a media sequence. The media sequence may contain representations of one or more objects. The system may be further caused to determine an identity of at least one object of the one or more objects. The system may yet be further caused to determine one or more keywords representative of the media sequence. The keywords may be determined based on the identified objects. The system may also be caused to determine one or more audio tracks for presentation with the media sequence. The audio tracks may be determined based on the one or more keywords. The system may be caused to output an indication of the determined one or more audio tracks.

According to additional example implementations, a method, system, and computer program product are provided. The method, system, and computer program product may include one or more of the respective features described above, and may further include determining an arrangement of the audio tracks. The arrangement may be keyed to the images or audio data and based on determined or preexisting divisions or demarcations therein.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology include automatically suggesting audio, video, or other media accompaniments to media content based on identified objects in the media content. In an example scenario, a user may record, from a smartphone, a fifteen-second video clip of a given subject and upload the video to a content-sharing platform. Before publishing the video, the user may wish to add an audio track to the video to play in the background. According to certain implementations, this process can be at least partially automated by a computing device. For example, a visual search can be run by a computing device across frames of the video to identify the pets, people, buildings, and other objects present in the video. Based on the identified objects, additional characteristics about the video may be determined, such as featured locations, languages, and time periods associated with the video. Keywords may be generated based on the identified objects and determined characteristics, and used, for example, as search terms, to determine relevant audio tracks. Accordingly, the user might be presented with a selection of music including audio tracks with titles, content, and/or an artist having some association with one or more subjects of the recorded video clip.

In some implementations, multiple media tracks may be suggested (e.g., two audio tracks for a video exceeding the duration of a single song). Moreover, the suggested tracks may be keyed to play back with particular portions of the media content. For example, different sets of keywords may be determined for various segments of video content based on the sets of objects identified in each corresponding segment. Accordingly, a suggested arrangement of multiple audio tracks may reflect changes in content over the length of the video.

Throughout this disclosure, certain implementations are described in exemplary fashion in relation to methods for suggesting audio accompaniments based on identified objects in video content. However, implementations of the disclosed technology are not so limited, and may include suggesting audio, image, video, or other media accompaniments based on aural, visual, or other features identified in media content. Moreover, some implementations may consider metadata such as meta tags, embedded data, and file information when determining keywords or suggesting media accompaniments for media content.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for automatically suggesting audio, video, or other media accompaniments to media content based on identified objects in the media content, according to example implementations of the disclosed technology, and will now be described with reference to the accompanying figures.

Figure 1:
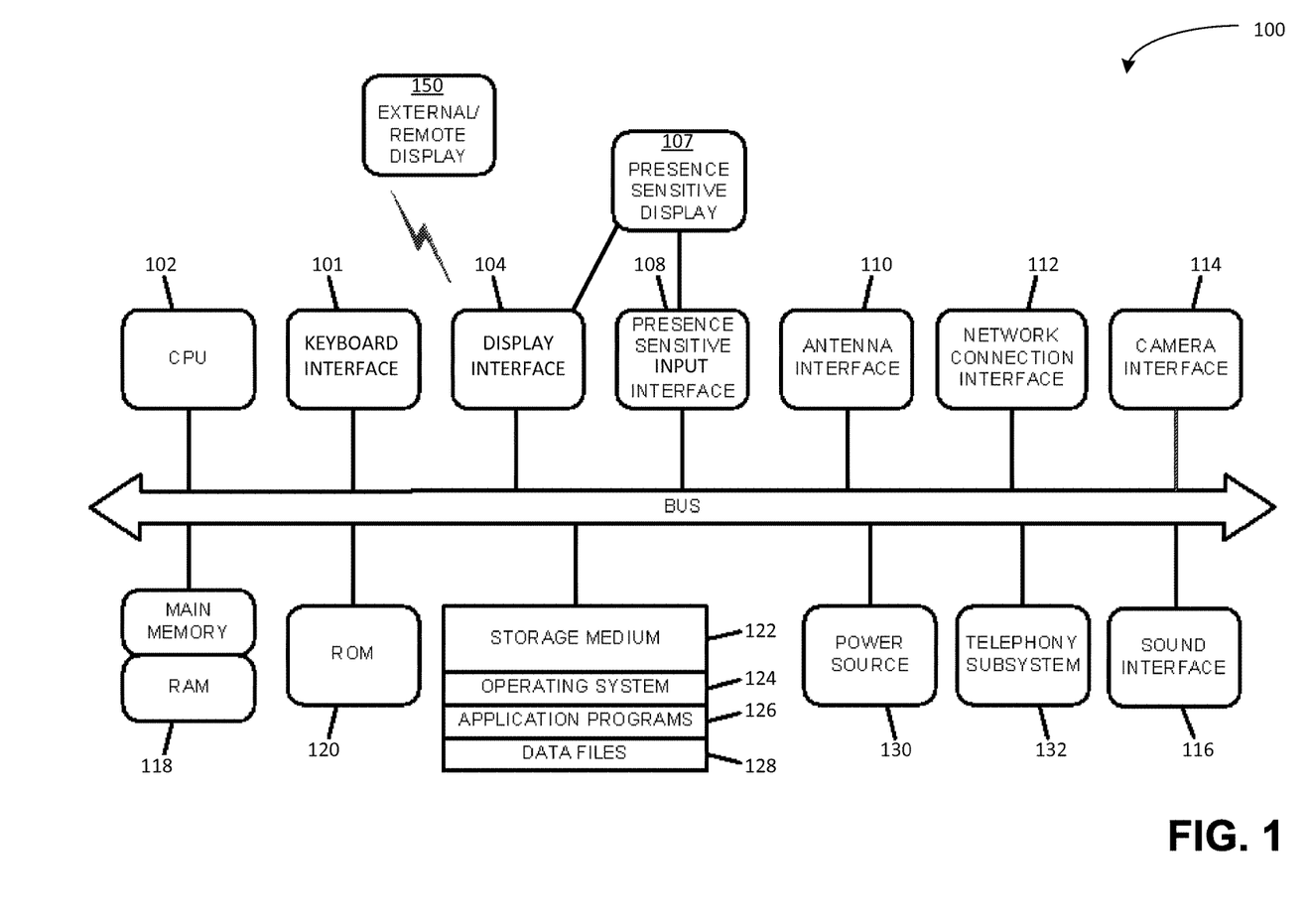
FIG. 1 depicts a block diagram of an illustrative computing device architecture 100, according to an example implementation.
Figure 2:
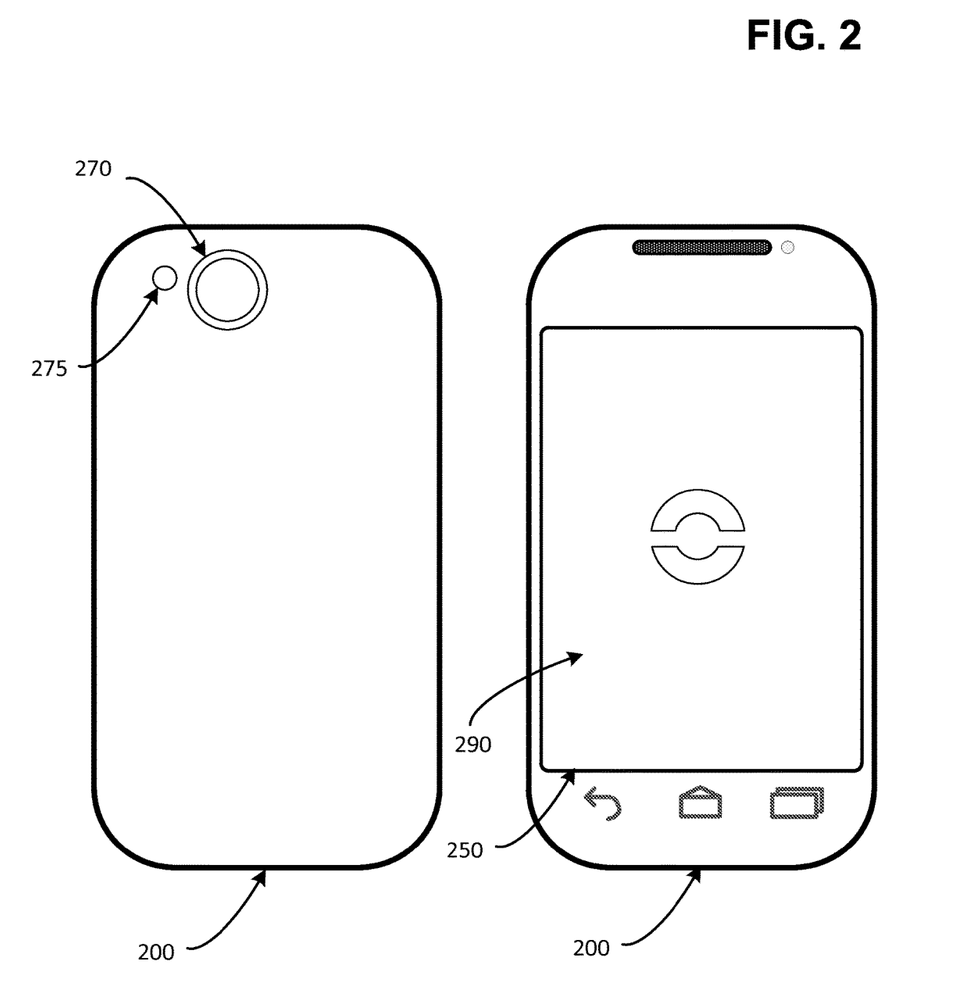
FIG. 2 depicts an illustration of a computing device 200, according to an example implementation.

FIG. 1 depicts a block diagram of an illustrative computing device architecture 100, according to an example implementation. Certain aspects of FIG. 1 may be embodied in a computing device 200 (for example, a mobile computing device as shown in FIG. 2). As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes and a telephony subsystem 132 that allows the device 100 to transmit and receive sound over a telephone network. The constituent devices and the CPU 102 communicate with each other over a bus 134.

In accordance with an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device 200, such as a smartphone or tablet computer. In this example embodiment, the computing device may output content to its local display and/or speaker(s). In another example implementation, the computing device may output content to an external display device (e.g., over Wi-Fi) such as a TV or an external computing system.

In example implementations of the disclosed technology, the computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device 200 may be a mobile computing device, for example, a smartphone or a tablet. The computing device may have a built-in or integrated display 250. The display 250 may be combined with a presence sensitive input device to form a touch-sensitive or presence-sensitive display for receiving user input from a stylus, finger, or other means of gesture input. In some implementations, the computing device may be a non-mobile computing device, for example, a personal computer or server. In some implementations, the computing device may also include or be associated with a sound producing device 280, such as a speaker, piezoelectric buzzer, or the like.

The computing device 200 may be in communication with an image capture device 270. For example, as shown in FIG. 2, the computing device may include a built-in or internal image capture device, for example, a camera or CCD. In another example implementation, the image capture device may be external to the computing device and in communication with the computing device, for example, through a direct connection, or wireless coupling.

In certain implementations, the computing device 200 may include one or more antennas or radios for wireless communication. These may include antennas for receiving GPS, Wi-Fi, or other radio communications. In addition, the computing device may include one or more sensors for detecting, for example and without limitation, temperature, pressure, altitude, magnetic heading, etc.

In certain implementations, the computing device 200 may comprise or be associated with one or more non-volatile storage devices such as hard disk drives or flash memory drives. The storage devices may be internal or external. In some implementations the storage devices may include peripheral devices, for example, an external USB hard drive. The storage devices may also be connected by a network or accessible as a cloud resource, such as network attached storage (NAS) or storage area network (SAN) file systems.

As described herein, implementations of the disclosed technology include automatically suggesting audio, video, or other media accompaniments to media content based on identified objects in the media content. In some implementations, the media content may reflect real life events recorded or captured by, for example, an image capture device 270 such as a camera or video recorder. The media content may also be generated, for example by being drawn by an artist or programmatically rendered, e.g., by a computing device 200.

According to certain implementations, the media content may include, or be at least partially embodied by, one or more images. The images may include a collection of pictures, such as a photo album or sequence of screen shots. The collection of pictures may be in a preexisting arrangement, or associated with instructions or other data for arranging the pictures, for sequential or concurrent viewing, such as in a slideshow or collage.

The media content may also or alternatively include, or be at least partially embodied by, one or more video sequences. The video sequences may include a generated animation or a recorded clip. The video sequences may be in a preexisting arrangement, or associated with instructions or other data for arranging the video sequences. For example, the video sequences may be pre-marked or divided into segments, such as chapters, tracks, or time intervals.

According to certain implementations, one or more representative images may be extracted or generated from the media content to provide a set of images suitable for running a visual search. Reducing the number or quality (e.g., resolution, color-depth, etc.) of images for analysis may reduce required storage space, computational load, or network traffic. Accordingly, for a collection of photographs, for example, extraction may include one or more of selecting a representative subset of the collection of photographs, cropping portions of the photographs, or converting the photographs to black and white, etc. Similarly, for a video sequence, extraction may include one or more of selecting a representative subset of frames from the video, altering the resolution, or downsampling, etc. Alternatively, a visual search may be applied to each of the pictures or frames in the media content unaltered.

In some implementations, a representative subset of photographs or frames may be selected from a collection or video by choosing every nth photograph or frame, or images captured at, or frames occurring at, particular time intervals. Representative subsets may also be chosen by leveraging preexisting information about the media content, for example selecting a frame from each designated chapter of a DVD.

However, representative subsets may also be chosen at irregular or programmatically determined intervals. In some implementations, the photographs or frames may be preprocessed to determine various characteristics, such as, without limitation, color profile, an amount of change since a previous frame or next frame, or designation as a key frame. The information derived from preprocessing may be used to determine a representative subset of the media content. For example, during preprocessing, a video may be segmented into scenes and a representative image chosen from each scene. Various techniques for the detection and representation of scenes in videos (e.g., using graph partitioning) are known in the art and are not discussed at length herein.

According to certain implementations, the identity of objects in the media content may be determined by running a visual search over one or more representative images or frames of the media content. The search may identify or recognize objects in an image, such as, without limitation, people, pets, vehicles, and buildings. Various techniques for automatically recognizing objects from images are known in the art (e.g., using a database of feature vectors) and are not discussed at length herein.

According to certain implementations, one or more keywords may be generated based on the identified or recognized objects. A one-to-one relationship between objects and keywords is possible but not required. A single keyword may be determined based on multiple identified objects and a single identified object may be used to determine multiple keywords. Moreover, different pairings of identified objects may result in different keywords. For example, an identified pair of a car and checkered flag may result in a different keyword than an identified pair of a car and stoplight.

In some implementations, a list of generated keywords may be expanded to include alternate word forms, synonyms, and related words to keywords determined based on identified objects. For example, the identification of a cat, may result in a keywords including "cat", "cats", "kittens", "feline", "lion", "neko," "Kentucky," etc. In an example implementation, a detected language associated with or featured in the media content, or associated with the recording device or computing device used to generate the media content, may be used to determine additional suitable word forms.

According to certain implementations, one or more audio tracks may be determined based on the identified objects. In some implementations, this includes using the keywords to determine appropriate or relevant audio tracks. For example, a query may be formed based on the keywords and sent to a search engine for processing. In some implementations, the search engine may be media specific, such as a music search engine, although it does not have to be. In some implementations, the search may include matching the keywords to various discographical information including, without limitation, artist, title, album, composer, or even the lyrics of a song.

According to certain implementations, one or more weights may be associated with the keywords. Weighting a keyword positively may give that keyword priority over other keywords, for example, during a search based on the keywords. In some implementations, a weight for a keyword may be determined based on the detected characteristics of the identified object the keyword is based on. For example, how much of an image the identified objects takes up, or how often the identified object appears in a single image or collection of images. In an example implementation, an identified object with a high frequency of identification or recognition may result in keywords that are weighted more heavily than keywords based on identified objects with a lower detected frequency of appearance. Keywords may also be weighted based on other factors, for example, whether the generated keyword matches a language associated with a video or the device that generated or recorded the video; or the specificity of the keyword. For example, the keyword "skyscraper" may be provided greater weight than the keyword "building", and the keyword "Empire State Building" an even greater weight.

According to certain implementations, the audio tracks may be determined based on additional determined characteristics, including languages, locations, time-periods, or other features associated with or identified in the media content. Moreover, a single image or frame may be associated with multiple languages, locations, or time-periods, etc.

In some implementations, a language associated with the media content may be determined based on identifying or recognizing one or more objects in images embodying the media content. For example, the images may contain one or more symbols, characters, or words, for example, on a street sign or advertisement. The images may also contain a person associated with a specific language, for example a native language. These features may be used to determine one or more relevant languages. The languages may be used to aid the determination of audio tracks, for example, by specifying a target language for keywords used to search for audio tracks. In some implementations, the title, lyrics, or other discographical information of suggested track may contain or be in a determined language. In some implementations, a native language of a singer associated with a suggested track may match a determined language.

In some implementations, functionality for identifying or recognizing persons may be completely or partially disabled at the will of a user. In other words, a user may be able to opt-out of certain object recognition.

In some implementations, a location associated with the media content may be determined based on identifying or recognizing one or more objects in images embodying the media content. For example, the images may contain, without limitation, one or more landmarks, building, or signs. These features may be used to determine one or more relevant locations. The locations may be used to aid the determination of audio tracks, for example, by including a name of the location in a search, e.g., New York City, or Madison Square Garden, or by narrowing the search space to music distributed or popular within certain geographic area.

In some implementations, a time or period associated with the media content may be determined based on identifying or recognizing one or more objects in images embodying the media content. For example, the images may contain, without limitation, one or more calendars, time displays or time-keeping devices. A time may also be determined from environmental context, such as the identification of seasonal features, celestial bodies, car models, people, tidal patterns, etc. These features may be used to determine one or more relevant time periods. The time periods may be used to aid the determination of audio tracks, for example, by narrowing the search space to music performed released, distributed or popular within or near certain time-periods.

In some implementations, one or more of the languages, locations, and time-periods may be used to identify an event. For example, the identification of English, a stadium, and February, in combination with a football may be used to identify a Super Bowl. Also, in some implementations, the identified languages, locations, and time-periods may be used directly to at least partially determine search keywords, for example, "The Big Game."

According to certain implementations, the audio tracks may be determined based on a determined mood or atmosphere associated with the media content. For example, media content evoking a dark mood could be paired with gloomy or minor-keyed audio tracks. In some implementations, a mood may be determined based on analyzing lighting, color spectra, or other characteristics of images embodying the media content. For example, it may be determined that a video is dark or has a predominance of cold colors. In some implementations, the mood may be used to aid the determination of audio tracks, for example, by narrowing the search space to music of a corresponding genre, tempo, key, etc.

According to certain implementations, information gathered from meta data such as tags or file information may be used to determine audio tracks, or keywords for determining audio tracks. For example, file information such as a file creation date may provide insight as to a time period associated with a recorded video. Many modern image capturing devices 270 are capable of saving time, location, and other data with captured image data. In another example, a primary language associated with an image capture device, or computing device that generated the media content, may be discerned from the meta data.

According to certain implementations, the determined audio tracks may be presented to a user for confirmation, or selection therefrom, particularly if multiple audio tracks have been successfully determined. In some implementations, a user may be presented with multiple audio tracks to choose from for each individual image, frame, segment, or other discrete division of the media content.

In some implementations, a sole determined or top ranked track may be automatically selected by a computing device for presentation with the media content. In another implementation, an audio track may be automatically chosen for each segment or discrete portion of the media content. In some implementations, multiple audio tracks, either selected by a user or automatically by a computing device, may be automatically keyed, synchronized, or otherwise arranged for presentation with the media content by a computing device. The transition between tracks or similarity of adjacent tracks may be a factor in determining the most suitable tracks or an arrangement of tracks for presentation with the media content. In some implementations, a track may be altered to improve matching with other tracks or synchronization with the media content. For example, the tempo of a track may be changed, or a crossfade effect added.

Heretofore, certain implementations of the disclosed technology have been described largely in relation to determining audio tracks for presentation with media content represented by one or more images. However, according to certain implementations, the media content may, alternatively or in combination with the images, include, or be at least partially embodied by, audio data. The audio data may include, for example and without limitation, recorded background noise, vocals, narration, sound effects, inaudible sounds, reference signals, e.g., for acoustic location, animal calls, church bells, etc.

Similar to as described above in relation to images, representative audio samples may be extracted from the audio data and analyzed. An aural search may be run by a computing device across the audio samples to identify or recognize aural features, or objects, in the media content. Various techniques for automatically recognizing aural features from audio data are known in the art (e.g., spectrogram pattern matching) and are not discussed at length herein. In some implementations, insights gained from aurally recognized objects and may be combined with insights gained from visually recognized objects, and the combination used to determine keywords, and audio tracks or other media accompaniments.

According to certain implementations, the audio data may be used also to determine additional characteristics about the media content including languages, locations, times periods, or other features associated with or identified in the media content.

In some implementations, a language associated with the media content may be determined based on identifying or recognizing one or more objects in audio samples embodying the media content. For example, the audio samples may contain sounds recognizable as spoken word or singing. In another example, the audio samples may contain a voice sample attributable to a speaker associated with a particular language.

In some implementations, a location associated with the media content may be determined based on identifying or recognizing one or more objects in audio samples embodying the media content. For example, the audio samples may contain a spoken or otherwise vocalized indication of a location. In another example, the audio samples may contain reference signals used for acoustic location, triangulation, or fingerprinting. These features may be used to determine one or more relevant locations.

In some implementations, a time or period associated with the media content may be determined based on identifying or recognizing one or more objects in audio samples embodying the media content. For example, the audio samples may contain a spoken or other aural indication of a time or time-period, such as a church bell or whistle.

In some implementations, an audio sample may already comprise an indication of a song or pre-recorded audio sample. The song may be identified, and a corresponding audio track determined for presentation with the media content to augment or complement the song. For example, a song playing softly in the background of a recorded video may be identified and a corresponding audio track paired with the media content in order to increase the volume or fidelity of the background song.

According to certain implementations, media content recorded or generated at a first device, e.g., an image capture device 270 or computing device 200, may be at least partially analyzed at a second device. For example, a user may record a video at a mobile computing device, as shown in FIG. 2, and upload the video to a server or other remote computing device for processing. The second device may have access to additional resources, for example, increased computing power, storage, or particular databases or other repositories of media.

For instance, in some implementations, media content may be recorded and a representative subset of the media content extracted at a first computing device 200, e.g., a smartphone. The representative subset may be uploaded from the smartphone to a remote storage location and processed by a computing device at an online service provider. The service provider may determine one or more suitable audio tracks and send an indication of the audio tracks (e.g., the tracks themselves, links thereto, or other identifying information) back to the smartphone. In another implementation, the service provider may determine keywords without determining suitable audio tracks and provide the keywords to the first computing device, or to a third computing device at another service provider. Thus, preprocessing and other steps of determining may be apportioned between multiple computing devices.

According to certain implementations, the determined media accompaniments may be at least partially limited to media residing on or available in a particular storage location, network, or available from a particular service provider. For example, audio tracks available from a particular source may be exclusively presented to a user or used as a search space for determining suitable tracks. In another example, audio tracks available from a particular source may be given priority over tracks from other sources.

In some implementations, a search may be restricted to audio tracks locally available to or under the control of a computing device 200 that generated or recorded the media content, for example, audio tracks on an internal memory (e.g., SDHC), a peripheral storage (e.g., USB hard drive), a local network device (e.g., NAS), or online storage account (e.g., Google Drive) associated with the computing device or a user of the computing device. In some implementations, where processing is performed at least partially at a second computing device, a first computing device may provide an indication of locally available media to the second computing device.

In another example, a search may also return audio tracks not locally available to the first computing device but give priority in suggestion or placement to the locally available tracks when determining suitable audio tracks or presenting determined audio tracks. In some implementations, tracks from different sources may be visually differentiated when presented to a user. In another implementation, links may be provided to purchase or otherwise gain permission to access audio tracks or other content not locally available.

In another example, audio tracks may be at least partially limited to tracks available from a particular service, for example, Google Play Music. The audio tracks may be further limited to tracks available to or associated with a particular user account of the service.

According to certain implementations, the media content may be streamed, produced, or otherwise made available in real time. As the audio and video data are received, visual and aural searches may be run by a computing device. Accordingly, objects may be recognized, and media accompaniments suggested in virtually real-time, subject to processing and JO constraints. Thus, some implementations may be used to provide a live media accompaniment. For example, a live soundtrack at a sporting event may include audio tracks based on real-time events occurring on court. In another example, the lighting system or video display at a concert may be controlled by routines suggested based on aural features detected in the audio of a live performance. Media accompaniments may also include automatically generated meta tags, descriptions, and synopsis of media content.

Figure 3:
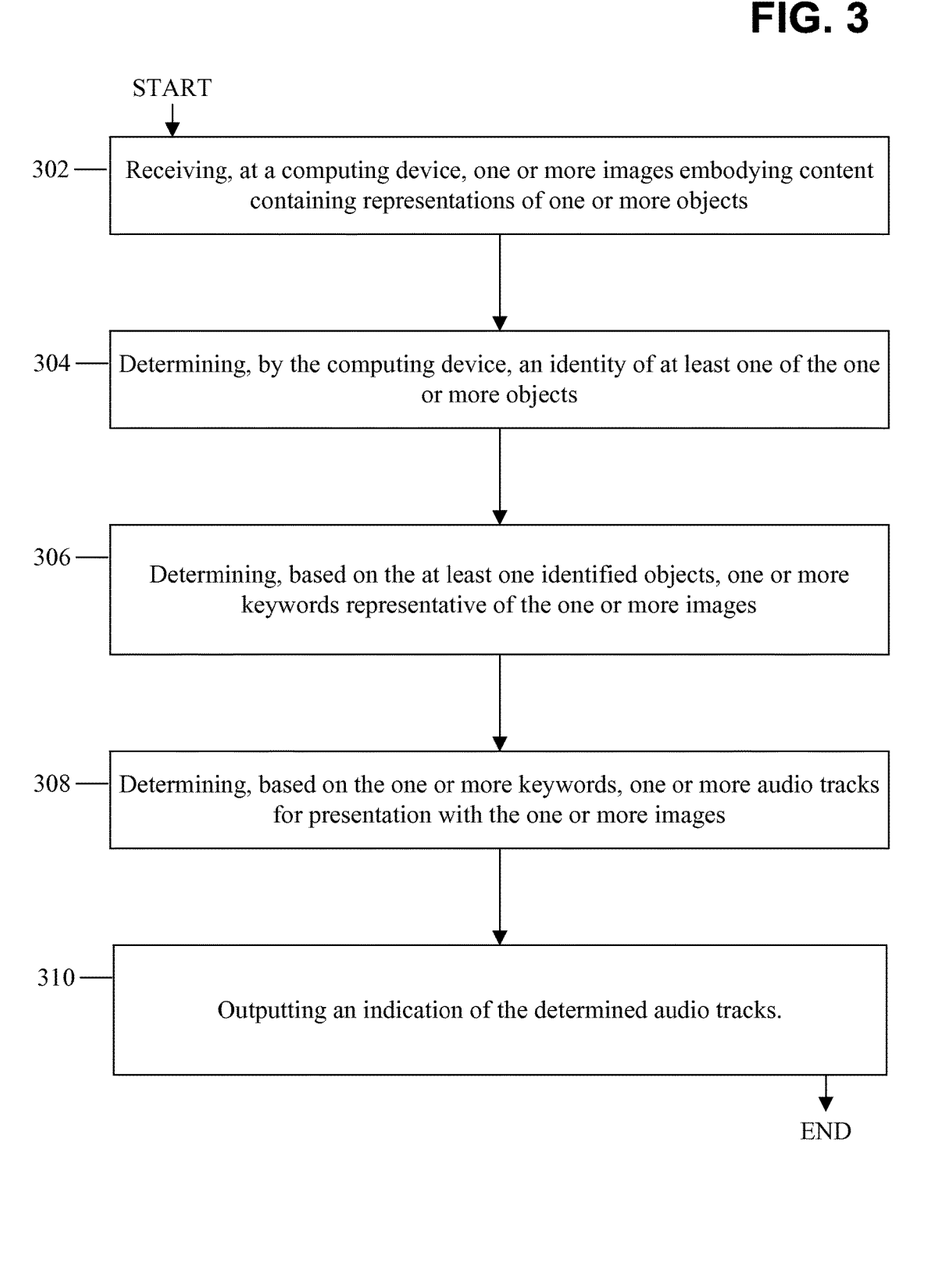
FIG. 3 is a flow diagram of a method 300 for automatically suggesting audio accompaniments based on identified objects in images, according to an example implementation.

FIG. 3 is a flow diagram of a method 300 for automatically suggesting audio accompaniments based on identified objects in images, according to an example implementation. As shown in FIG. 3, the method 300 starts in block 302, and, according to an example implementation, includes receiving, at a computing device, one or more images embodying content containing representations of one or more objects. In block 304, the method 300 includes determining, by the computing device, an identity of at least one object of the one or more objects. In block 306, the method 300 includes determining, based on the identified at least one object, one or more keywords representative of the one or more images. In block 308, the method 300 includes determining, based on the one or more keywords, one or more audio tracks for presentation with the one or more images. In block 310, the method 300 includes outputting an indication of the determined one or more audio tracks.

It will be understood that the various steps shown in FIG. 3 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    identifying, by a computing device, a video item comprising a plurality of frames, wherein the video item was recorded using a video camera;
    analyzing the plurality of frames of the video item to identify visual objects in the video item;
    determining a plurality of keywords representative of the visual objects in the video item;
    determining weights for the plurality of keywords based on a frequency of appearance of corresponding visual objects in the analyzed plurality of frames, wherein a weight for a respective keyword of the plurality of keywords increases corresponding to a higher frequency of appearance of a corresponding visual object in the analyzed plurality of frames of the video item;
    identifying an audio item that is related to one or more keywords of the plurality of keywords associated with higher weights than other keywords of the plurality of keywords, wherein identifying the audio item comprises:
        providing a plurality of audio items that are related to the one or more keywords associated with higher weights than other keywords of the plurality of keywords for selection by a user, and
        receiving an indication of a user selection of the audio item from the plurality of audio items; and
    providing the audio item for playback, wherein the playback of the audio item is concurrent with playback of the video item.

2. The method of claim 1, further comprising:
    determining, based on the identified visual objects in the video item, a geographic location depicted in the video item, wherein the audio item is identified based on the geographic location.

3. The method of claim 2, further comprising:
    identifying that the visual objects in the video item comprise a landmark, wherein the geographic location is determined based on the identified landmark.

4. The method of claim 2, further comprising:
    identifying that the visual objects in the video item comprise a building, wherein the geographic location is determined based on the identified building.

5. The method of claim 2, further comprising:
    identifying that the visual objects in the video item comprise a sign, wherein the geographic location is determined based on the identified sign.

6. The method of claim 2, further comprising:
    identifying the visual objects in the video item comprise text, wherein the geographic location is determined based on the identified text.

7. The method of claim 1, further comprising:
    determining, based on the visual objects in the video item, a time period during which the video item was recorded, wherein the audio item is identified based on the time period during which the video item was recorded.

8. The method of claim 7, further comprising:
    identifying the visual objects in the video item comprise a time-keeping device, wherein the time period during which the video item was recorded is determined based on the identified time-keeping device.

9. The method of claim 7, further comprising:
    identifying the visual objects in the video item comprise a celestial body, wherein the time period during which the video item was recorded is determined based on the identified celestial body.

10. A non-transitory computer-readable medium that stores instructions that, responsive to execution by a computing device, cause the computing device to perform operations comprising:
    identifying, by the computing device, a video item comprising a plurality of frames;
    analyzing the plurality of frames of the video item to identify visual objects in the video item;
    determining a plurality of keywords representative of the visual objects in the video item;
    determining weights for the plurality of keywords based on a frequency of appearance of corresponding visual objects in the analyzed plurality of frames, wherein a weight for a respective keyword of the plurality of keywords increases corresponding to a higher frequency of appearance of a corresponding visual object in the analyzed plurality of frames of the video item;
    identifying an audio item that is related to one or more keywords of the plurality of keywords associated with higher weights than other keywords of the plurality of keywords, wherein identifying the audio item comprises:
        providing a plurality of audio items that are related to the one or more keywords associated with higher weights than other keywords of the plurality of keywords for selection by a user, and receiving an indication of a user selection of the audio item from the plurality of audio items; and providing the audio item for playback, wherein the playback of the audio item is concurrent with playback of the video item.

11. The non-transitory computer-readable medium of claim 10, further comprising:

determining, based on the identified visual objects in the video item, a geographic location depicted in the video item, wherein the audio item is identified based on the geographic location.

12. The non-transitory computer-readable medium of claim 11, further comprising:

identifying that the visual objects in the video item comprise a landmark, wherein the geographic location is determined based on the identified landmark.

13. The non-transitory computer-readable medium of claim 11, further comprising:

identifying that the visual objects in the video item comprise a sign, wherein the geographic location is determined based on the identified sign.

14. The non-transitory computer-readable medium of claim 10, further comprising:

determining, based on the visual objects in the video item, a time period during which the video item was recorded, wherein the audio item is identified based on the time period during which the video item was recorded.

15. A system comprising:

a memory; and a computing device, coupled to the memory, the computing device to:

identify a video item comprising a plurality of frames, wherein the video item was recorded using a video camera;

analyze the plurality of frames of the video item to identify visual objects in the video item;

determine a plurality of keywords representative of the visual objects in the video item;

determine weights for the plurality of keywords based on a frequency of appearance of corresponding visual objects in the analyzed plurality of frames, wherein a weight for a respective keyword of the plurality of keywords increases corresponding to a higher frequency of appearance of a corresponding visual object in the analyzed plurality of frames of the video item;

identify an audio item that is related to one or more keywords of the plurality of keywords associated with higher weights than other keywords of the plurality of keywords, wherein identifying the audio item comprises:

providing a plurality of audio items that are related to the one or more keywords associated with higher weights than other keywords of the plurality of keywords for selection by a user, and receiving an indication of a user selection of the audio item from the plurality of audio items; and provide the audio item for playback, wherein the playback of the audio item is concurrent with playback of the video item.

16. The system of claim 15, the computing device further to:

determine, based on the identified visual objects in the video item, a geographic location depicted in the video item, wherein the audio item is identified based on the geographic location.

17. The system of claim 15, the computing device further to:

determine, based on the visual objects in the video item, a time period during which the video item was recorded, wherein the audio item is identified based on the time period during which the video item was recorded.

* * * * *